No. 821,302. PATENTED MAY 22, 1906.
W. B. MEGONE.
MOTOR ROAD VEHICLE.
APPLICATION FILED AUG. 3, 1905.

3 SHEETS—SHEET 1.

WITNESSES:
G. Symes.
E. L. George

INVENTOR.
W. B. Megone.
Per Robert B. Phillips.
Attorney.

No. 821,302. PATENTED MAY 22, 1906.
W. B. MEGONE.
MOTOR ROAD VEHICLE.
APPLICATION FILED AUG. 3, 1905.
3 SHEETS—SHEET 2.
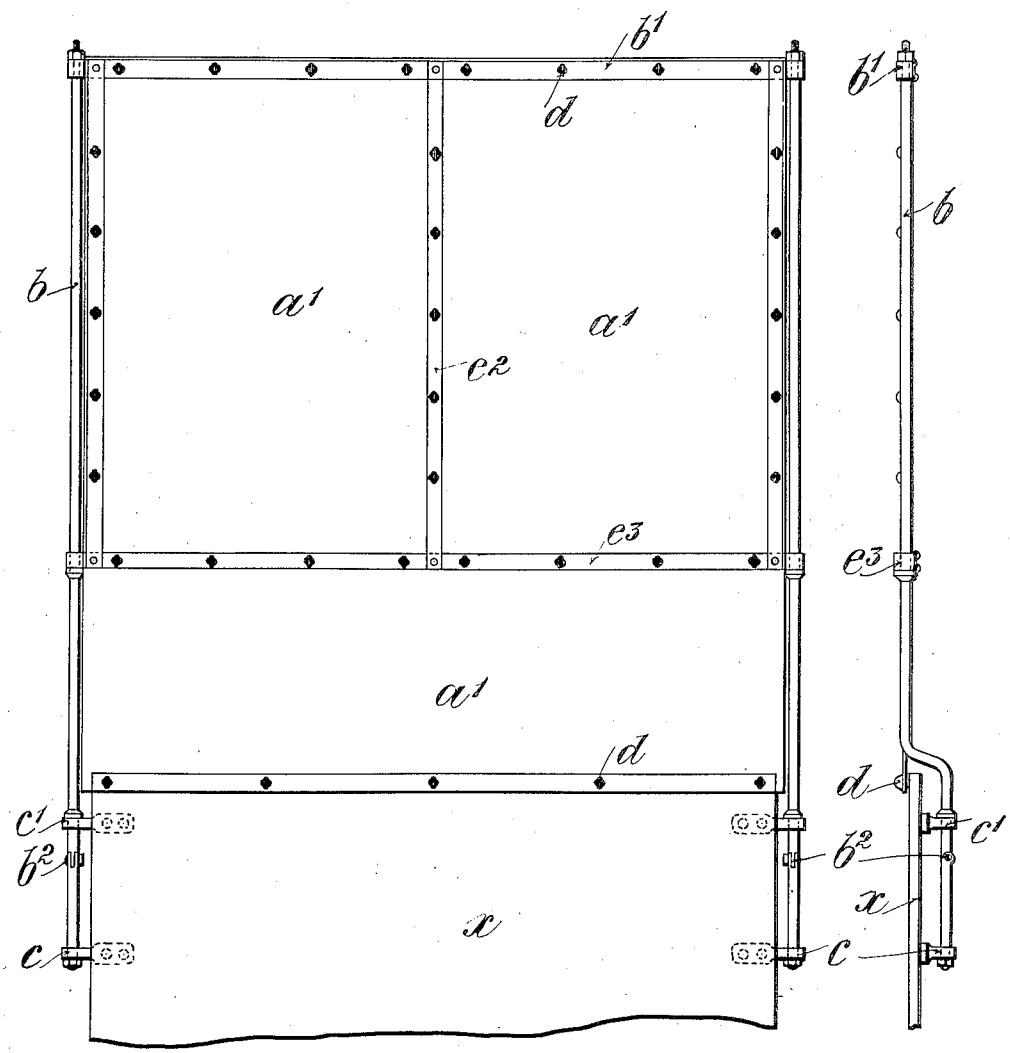
WITNESSES:
G. V. Symes.
E. L. George
INVENTOR.
W. B. Megone.
Per Robert S. Phillips
Attorney.

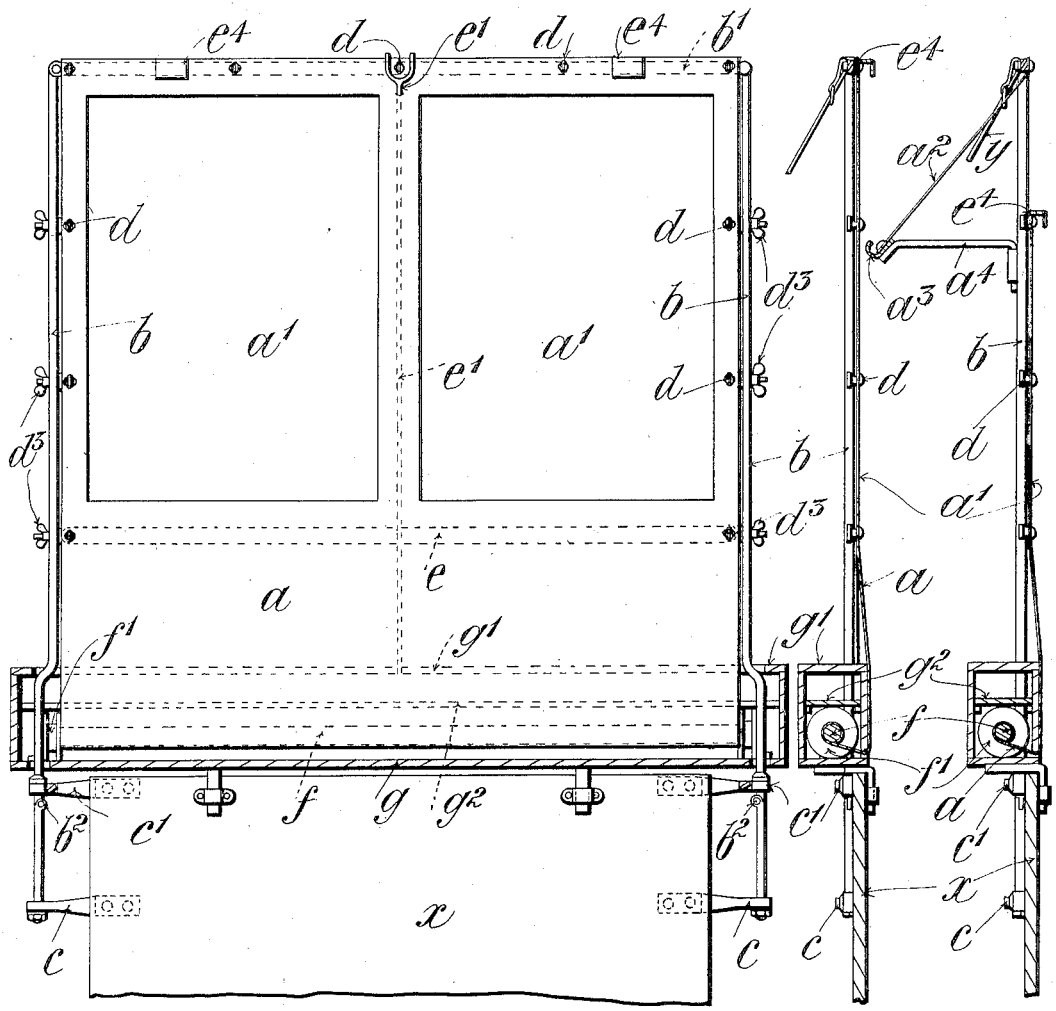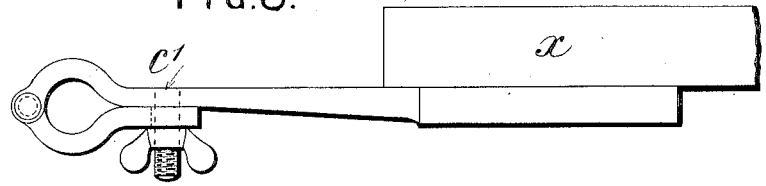

UNITED STATES PATENT OFFICE.

WILLIAM BERNARD MEGONE, OF PADDINGTON, ENGLAND.

MOTOR ROAD-VEHICLE.

No. 821,302.     Specification of Letters Patent.     Patented May 22, 1906.

Application filed August 3, 1905. Serial No. 272,541.

*To all whom it may concern:*

Be it known that I, WILLIAM BERNARD MEGONE, a subject of the King of Great Britain and Ireland, residing at 14 Oxford Terrace, Paddington, in the county of Middlesex, England, have invented a new and useful Improvement in and Relating to Motor Road-Vehicles, of which the following is a specification.

This invention relates to wind or rain shields for motor road-vehicles, and comprises, essentially, an easily fixed and detachable shield provided with one or more windows formed from transparent celluloid or other suitable flexible and transparent material, the shield, together with its supporting-frame, being so arranged as to be readily folded together into a small compass and carried on any convenient part of the car when not in use.

Figure 1:
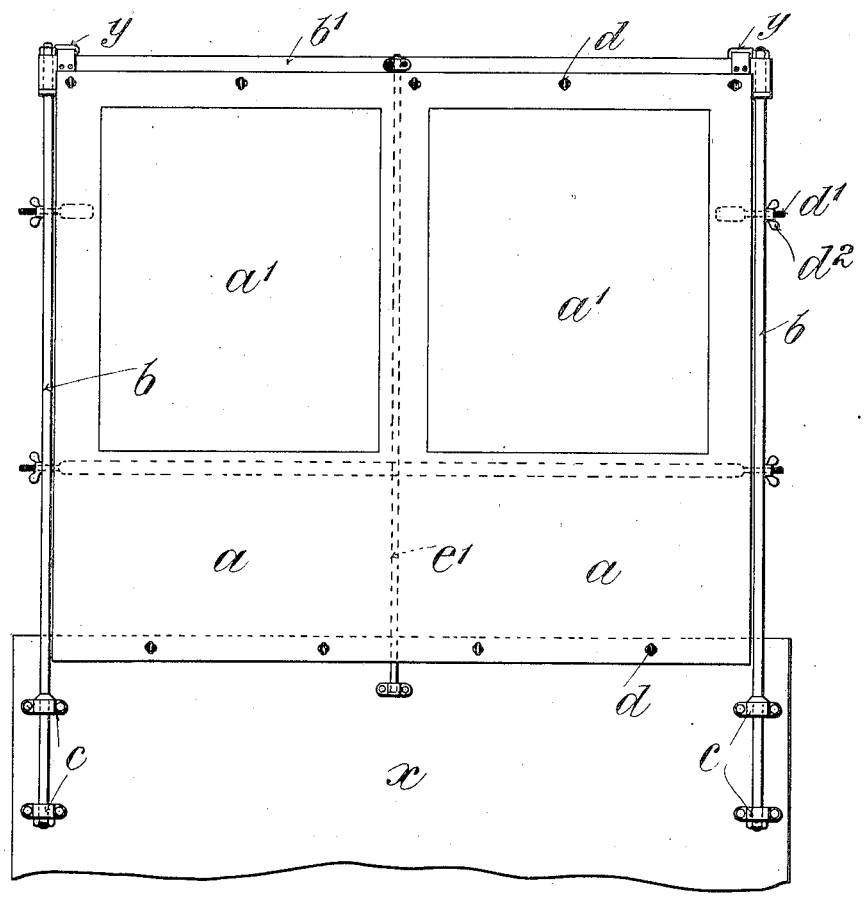
Figure 2:

In the accompanying drawings, which illustrate, by way of example, some methods of carrying this invention into effect, Figure 1 is a view in end elevation of a shield carried by its supporting-frame fixed on the dashboard of a motor road-vehicle. Fig. 2 is a view in side elevation thereof. Figs. 3 and 4 are similar views of a modification. Figs. 5 and 6 are also similar views, partly in section, of a further modification. Fig. 7 is a view in side elevation, partly in section, showing a modified arrangement; and Fig. 8 is a view in plan, on an enlarged scale, of one of the hinged clamps.

Throughout the views similar parts are marked with like letters of reference.

The shield is formed of any flexible waterproof material $a$, having one or more insertions $a'$ of transparent celluloid or other suitable transparent and flexible material, as shown in Figs. 1 and 5, or in some cases the entire shield may be made of the flexible transparent material $a'$, as illustrated in Fig. 3. This shield is carried by a frame which consists of a pair of uprights $b\ b$ and a top bar $b'$, the said uprights being carried by and secured in sockets or clamps $c$, fixed on the dashboard $x$ of the car or to a box carried thereon. Straps $y\ y$, removably connected with the top of the bar $b'$ and secured to any convenient part of the forward end of the vehicle, may be used in order to brace the frame against wind-pressure. In some cases it may be advisable to slope back or rake the frame in order to reduce the wind-pressure.

Referring to Figs. 1 and 2, the top bar $b'$ is removably fixed to the uprights $b\ b$ by forming sockets on the ends of the bar adapted to fit over the reduced top ends of the uprights and secured in position by nuts thereon. The shield is attached to the top bar $b'$ and to the top of the dashboard $x$ by forming eyelets in the material $a$ adapted to be engaged by studs or turn-buttons $d$, carried by said bar and dashboard, respectively. The shield is fixed and strained laterally by suitably attaching threaded studs $d'$ to the material $a$, which studs are adapted to pass through holes formed in the uprights $b\ b$ and to be engaged by butterfly-nuts $d^2$. To give additional support to the shield, a transverse bar $e$ may be permanently fixed to or within the material $a$, and a centrally-arranged vertical bar $e'$, fitting within a pocket or tuck in the said material and removable therefrom, may be removably fixed to the top bar $b'$ and dashboard $x$, as shown.

Referring to Figs. 3 and 4, in which the shield is composed entirely of flexible or rollable transparent material $a'$, the uprights $b\ b$ are jointed or hinged near their lower ends at $b^2$ in order to reduce their length and render them capable of being more easily stowed, in which case the upper clamps $c'$, carried by the dashboard $x$, are formed with hinged jaws (see Fig. 8) to enable the enlarged parts of the uprights, due to the hinged joints, passing freely through said clamps when putting up or taking down said uprights. The shield is fixed at its top and bottom, as previously described, and at its sides and center by means of suitably-disposed eyelets in the material-engaging studs $d$, carried by vertical bars $e^2$, removably fixed to the top bar $b'$ and to a removable transverse bar $e^3$, carried by the uprights $b\ b$.

Referring to Figs. 5 and 6, the top bar $b'$ is permanently hinged at its one end to one of the uprights $b$ and removably secured at its other end to the top of the other upright by means of a clamp or forked end and bolt or in other suitable manner. The shield is fixed at its upper end to a roller $f$, carried in suitable bearings within a box $g$, carried by the dashboard $x$. To enable the shield to be wound upon the roller, the latter may be provided with end pulleys $f'$, adapted to receive cords so arranged as to cause the roller to be rotated on pulling said cords, or the roller may be spring-controlled in a manner similar to a spring-blind. The box $g$, provided with a lid $g'$, is made of sufficient size to take the separate members of the frame when not erected for use. A false bottom $g^2$ is provided to prevent the said frame members resting upon the shield when wound on the roller.

To the top edge of the shield is attached a transverse bar $e^4$ in order to stiffen it and through which the eyelets for the studs $d$, carried by the top bar of the frame, are formed. The said bar $e^4$ is provided with hooks, stops, or equivalent devices arranged to engage the bottom or sides of the box $g$, and so prevent the edge of the shield being drawn into the box when the roller is operated to wind up the shield.

The sides of the shield are connected to the uprights by eyelets formed in the said shield engaging either studs $d$ carried by bolts passing through holes in the uprights $b\ b$ and secured thereto by butterfly-nuts $d^3$, as shown, by which arrangement a ready means is provided for laterally stretching the shield taut, or studs $d$ permanently fixed to the said uprights.

In some cases, as when it is raining, it is undesirable to have any transparent material in the line of sight, as the rain blurs it and renders driving difficult. In such cases it is advisable to partly lower the shield by rolling it partly onto its roller, when the upper end of the shield is held at whatsoever height on the uprights or on the inner frame may be desired by means of the various studs on those uprights or on the inner frame, as the case may be; but as when the shield is thus partly lowered the clear open space between the top of the frame $b'$ and the top of the shield may be greater than is necessary for the line of sight and also admits of an appreciable amount of rain beating onto the occupants of the car this is largely obviated by the use of an eyeleted strip of transparent flexible material of a width equal to the frame and of any desired depth. This auxiliary strip of transparent celluloid or other flexible transparent material is attached and stretched across the upper or inner frame. In order to prevent the rain which beats against this auxiliary strip being blown from the lower side of the strip through the clear open space between this lower side of the strip and the upper end of the partly-lowered shield, a removable metal gutter is provided of a length sufficient to reach from one upright $b$ to the other, to which it is removably attached by means of an eyelet at either end which fastens onto the studs on the uprights or inner frame, as the case may be. The rain-water running down the auxiliary strips drops into this metal gutter and runs off from the ends of the gutter near the uprights.

The auxiliary strip $a^2$ in Fig. 7 instead of being made fast at the sides flat against the studs on the uprights or inner frame may be carried by outwardly-projecting brackets $a^4$, removably fixed to the uprights $b\ b$, as shown. In such case each bracket carries a stud which is of a size to carry both the eyeleted ends of the metal gutter $a^3$ and the eyeleted bottom end of the auxiliary strip $a^2$.

The shield, together with the supporting-frames illustrated by Figs. 1 to 4, may be carried when not in use in boxes on the top of the dashboard in a manner similar to that described, and illustrated by Figs. 5 to 7, or preferably they are stowed away in boxes carried on the step or other convenient part of the vehicle.

What I claim, and desire to secure by Letters Patent, is—

1. In a motor road-vehicle a rain or wind shield comprising a foldable frame detachably carried by the dashboard of the vehicle, a shield consisting of a waterproof rollable material wholly or partially transparent, a box carried on said dashboard, a roller mounted to revolve in said box and carrying the lower edge of the shield, means for readily attaching and detaching the upper and side edges of said shield to and from the frame, and means for stretching said shield on the frame, substantially as set forth.

2. In a motor road-vehicle a rain or wind shield comprising a frame carried by the dashboard of the vehicle, a shield consisting of a waterproof rollable material wholly or partially transparent, means for readily and adjustably affixing said shield to the frame, and an auxiliary strip of transparent material carried on the upper part of said frame above the top edge of the shield, substantially as set forth.

3. In a motor road-vehicle a rain or wind shield comprising vertically-disposed and readily-removable uprights carried on the dashboard of the vehicle, horizontal rails carried by said uprights and forming therewith a supporting-frame, a shield consisting of a waterproof rollable material wholly or partially transparent, a box carried by said dashboard and adapted to contain the members of the supporting-frame when not in use, a roller mounted to revolve in said box and on which the shield is adapted to be wound, means whereby the shield may be readily fixed to and stretched on said frame, and an auxiliary strip of transparent material carried on the upper part of said frame above the top edge of the shield, substantially as set forth.

In testimony whereof I have signed my name to this specification in the presence of two subscribing witnesses.

WILLIAM BERNARD MEGONE.

Witnesses:
A. MILWARD FLACK,
G. V. SYMES.